US012031771B2

(12) United States Patent
Raskar et al.

(10) Patent No.: US 12,031,771 B2
(45) Date of Patent: Jul. 9, 2024

(54) BARRIER LAYER FOR INSULATED STRUCTURES

(71) Applicant: WHIRLPOOL CORPORATION, Benton Harbor, MI (US)

(72) Inventors: Devidas B. Raskar, St. Joseph, MI (US); Lorraine J. Westlake, Eau Claire, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 18/308,091

(22) Filed: Apr. 27, 2023

(65) Prior Publication Data

US 2023/0266053 A1     Aug. 24, 2023

Related U.S. Application Data

(63) Continuation of application No. 17/704,143, filed on Mar. 25, 2022, now Pat. No. 11,686,525, which is a
(Continued)

(51) Int. Cl.
*F25D 23/06* (2006.01)
*F24C 15/34* (2006.01)
(Continued)

(52) U.S. Cl.
CPC ............ *F25D 23/066* (2013.01); *F24C 15/34* (2013.01); *F25D 11/02* (2013.01); *F25D 23/06* (2013.01);
(Continued)

(58) Field of Classification Search
CPC .... F25D 23/066; F25D 23/06; F25D 2201/14; F25D 23/065; F25D 23/064; F25D 23/062; F25D 23/082; F25D 23/087; F25D 23/085; F25D 11/02; F24C 15/34; A47L 15/4251; A47L 15/4209; B32B 15/04; D06F 39/12; F16L 59/028; F16L 59/029; F16L 59/04; A47B 3/0434; E06B 3/663; E06B 3/6612; E06B 3/66328; E06B 3/667; E06B 3/66342; E06B 3/66352; E06B 3/6621; E06B 3/66366
See application file for complete search history.

(56) References Cited

U.S. PATENT DOCUMENTS 2,518,673 A    8/1950  Ellsworth
2,644,605 A    7/1953  Palmer
(Continued)

FOREIGN PATENT DOCUMENTS

AU      2017204798      7/2017
DE      102015222224    5/2017
(Continued)

*Primary Examiner* — Hiwot E Tefera
(74) *Attorney, Agent, or Firm* — Price Heneveld LLP

(57) ABSTRACT

An insulating structure for an appliance includes a trim breaker, a wrapper, and a liner. The wrapper and liner coupled to the trim breaker and at least partially defining a structural cabinet. A barrier is positioned between the liner and the wrapper. The barrier is also coupled to the trim breaker. An inner compressible gasket is proximate the liner, and an outer gasket is proximate the wrapper. The inner gasket and the outer compressible gasket are coupled to the barrier.

20 Claims, 12 Drawing Sheets

Related U.S. Application Data continuation of application No. 16/399,269, filed on Apr. 30, 2019, now Pat. No. 11,320,194.

(51) Int. Cl.
  *F25D 11/02* (2006.01)
  *F25D 23/08* (2006.01)
  *A47L 15/42* (2006.01)
  *B32B 15/04* (2006.01)

(52) U.S. Cl.
  CPC ........ *F25D 23/085* (2013.01); *A47L 15/4251* (2013.01); *B32B 15/04* (2013.01); *F25D 2201/14* (2013.01)

(56) References Cited

U.S. PATENT DOCUMENTS

| | | | |
|---|---|---|---|
| 2,644,606 A | 7/1953 | Voda et al. | |
| 2,792,959 A | 5/1957 | Diamond et al. | |
| 2,809,764 A | 10/1957 | Diamond | |
| 2,855,636 A | 10/1958 | Donnelly | |
| 4,831,780 A | 5/1989 | Bockwinkel | |
| 4,891,912 A * | 1/1990 | Bockwinkel | F25D 23/082 49/478.1 |
| 5,088,258 A * | 2/1992 | Schield | E06B 3/66342 52/204.593 |
| 5,466,534 A * | 11/1995 | Newby | E06B 3/66314 428/35.8 |
| 5,910,083 A * | 6/1999 | Richardson | A47F 3/0434 52/656.1 |
| 6,094,290 A | 7/2000 | Crawford et al. | |
| 6,148,563 A | 11/2000 | Roche et al. | |
| 6,485,122 B2 | 11/2002 | Wolf et al. | |
| 6,637,093 B2 * | 10/2003 | Richardson | A47F 3/0434 52/786.13 |
| 8,986,805 B2 | 3/2015 | Yoon et al. | |
| 10,697,699 B2 * | 6/2020 | Krishna | F25D 23/062 |
| 10,914,511 B2 | 2/2021 | Naik et al. | |
| 11,320,194 B2 | 5/2022 | Raskar et al. | |
| 11,686,525 B2 * | 6/2023 | Raskar | F25D 23/06 312/400 |
| 2007/0003717 A1 * | 1/2007 | Kawasaki | C08L 23/06 428/34 |
| 2010/0139195 A1 | 6/2010 | Tiniaov et al. | |
| 2010/0146883 A1 | 6/2010 | Benkel | |
| 2012/0104923 A1 | 5/2012 | Jung et al. | |
| 2015/0284987 A1 | 10/2015 | Lohwasser | |
| 2016/0258671 A1 | 9/2016 | Allard et al. | |
| 2017/0159996 A1 | 6/2017 | Deka et al. | |
| 2017/0298680 A1 | 10/2017 | Schreiber et al. | |
| 2018/0164022 A1 | 6/2018 | Ding et al. | |
| 2018/0164023 A1 | 6/2018 | Lv et al. | |
| 2018/0164024 A1 | 6/2018 | Lv et al. | |
| 2018/0164025 A1 | 6/2018 | Lv et al. | |
| 2018/0259243 A1 | 9/2018 | Lv et al. | |
| 2019/0120547 A1 | 4/2019 | Staud et al. | |
| 2019/0170431 A1 | 6/2019 | Naik et al. | |
| 2022/0214099 A1 | 7/2022 | Raskar et al. | |

FOREIGN PATENT DOCUMENTS

| | | |
|---|---|---|
| EP | 3647696 | 5/2020 |
| EP | 3696483 | 8/2020 |
| GB | 837929 | 6/1960 |
| WO | 2009013106 | 1/2009 |
| WO | 2017100037 | 6/2017 |
| WO | 2018044274 | 3/2018 |
| WO | 2019108204 | 6/2019 |

* cited by examiner

BARRIER LAYER FOR INSULATED STRUCTURES

CROSS-REFERENCE TO RELATED APPLICATION

The present application is a continuation of U.S. patent application Ser. No. 17/704,143 filed Mar. 25, 2022, entitled BARRIER LAYER FOR INSULATED STRUCTURES, now U.S. Pat. No. 11,686,525, which is a continuation of U.S. patent application Ser. No. 16/399,269 filed Apr. 30, 2019, entitled BARRIER LAYER FOR INSULATED STRUCTURES, now U.S. Pat. No. 11,320,194, the entire disclosures of which are hereby incorporated herein by reference.

BACKGROUND OF THE DISCLOSURE

The present disclosure generally relates to vacuum insulated structures, and more specifically, to a barrier layer for an insulated structure.

SUMMARY OF THE DISCLOSURE

According to one aspect of the present disclosure, an insulating structure for an appliance includes a trim breaker, a wrapper coupled to the trim breaker, and a liner coupled to the trim breaker. The liner and the wrapper at least partially define a structural cabinet. The insulating structure also includes a barrier positioned between the liner and the wrapper. The barrier is also coupled to the trim breaker. An inner gasket is proximate the liner and coupled to the barrier. An outer gasket is proximate the wrapper and coupled to the barrier.

According to another aspect of the present disclosure, an insulating structure includes a trim breaker, a first panel coupled to the trim breaker, and a second panel coupled to the trim breaker and proximate the first panel. The insulating structure also includes a barrier positioned between the first and the second panels.

According to yet another aspect of the present disclosure, an appliance includes a trim breaker, a first panel coupled to the trim breaker, and a second panel coupled to the trim breaker and proximate the first panel. The appliance also includes a barrier of a glass-type material positioned between the first and second panels. The barrier is coupled to the trim breaker. The appliance also includes a gasket assembly having an inner portion and an outer portion.

These and other features, advantages, and objects of the present disclosure will be further understood and appreciated by those skilled in the art by reference to the following specification, claims, and appended drawings.

Figure 1:
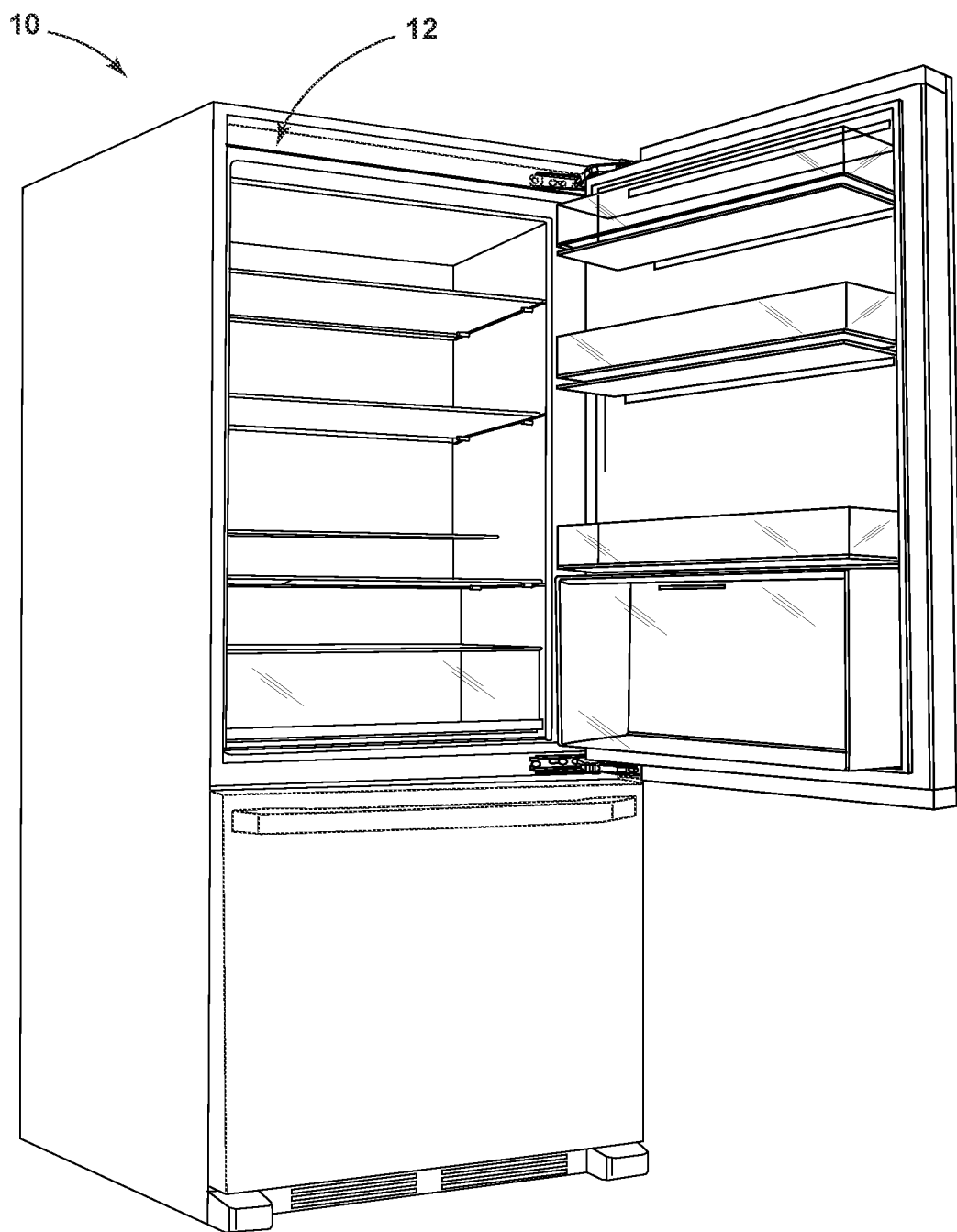
FIG. 1 is a perspective view of an appliance incorporating the insulating structure of the present disclosure.
Figure 2:
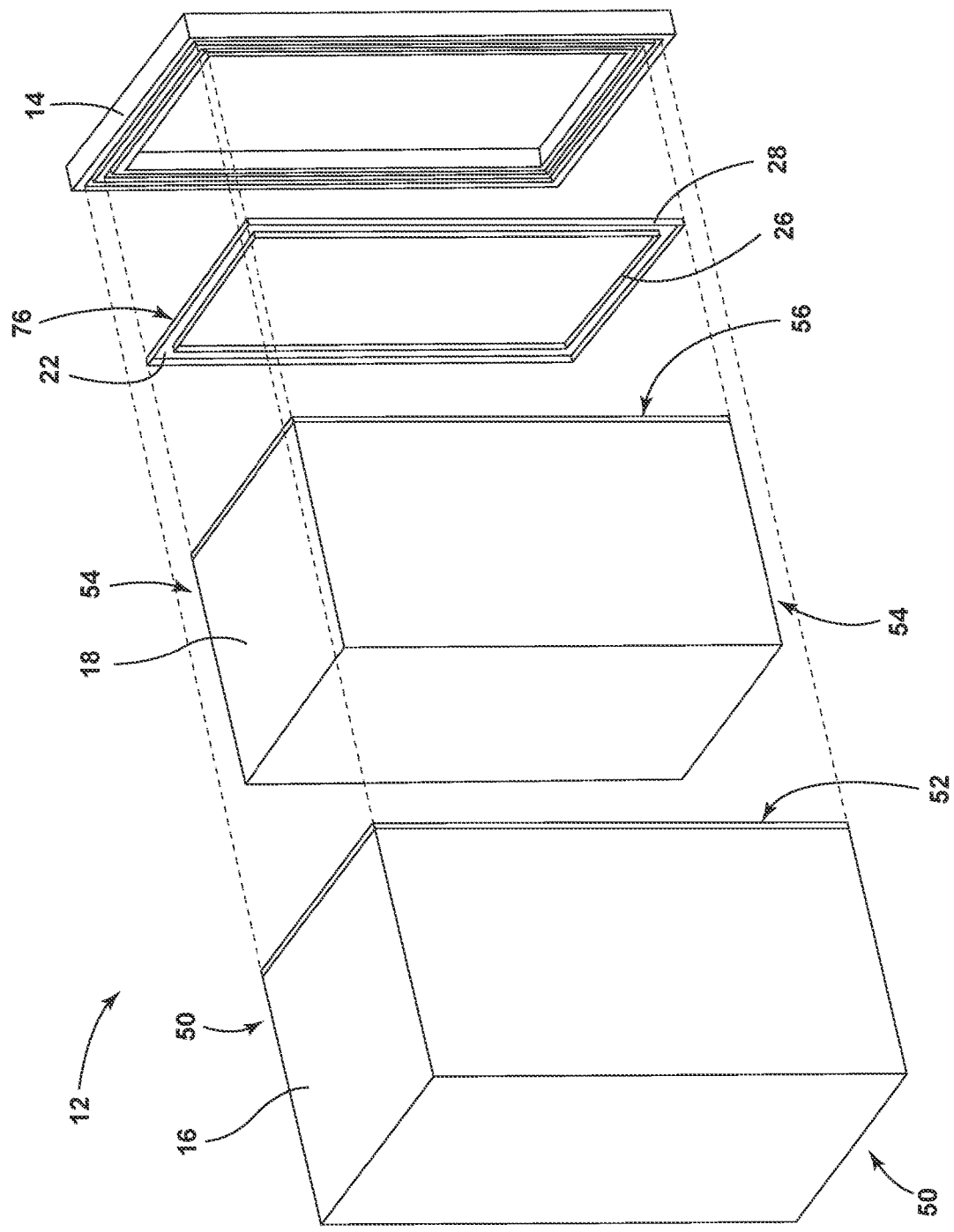
FIG. 2 is an exploded top perspective view of the insulating structure of the present disclosure.
Figure 3:
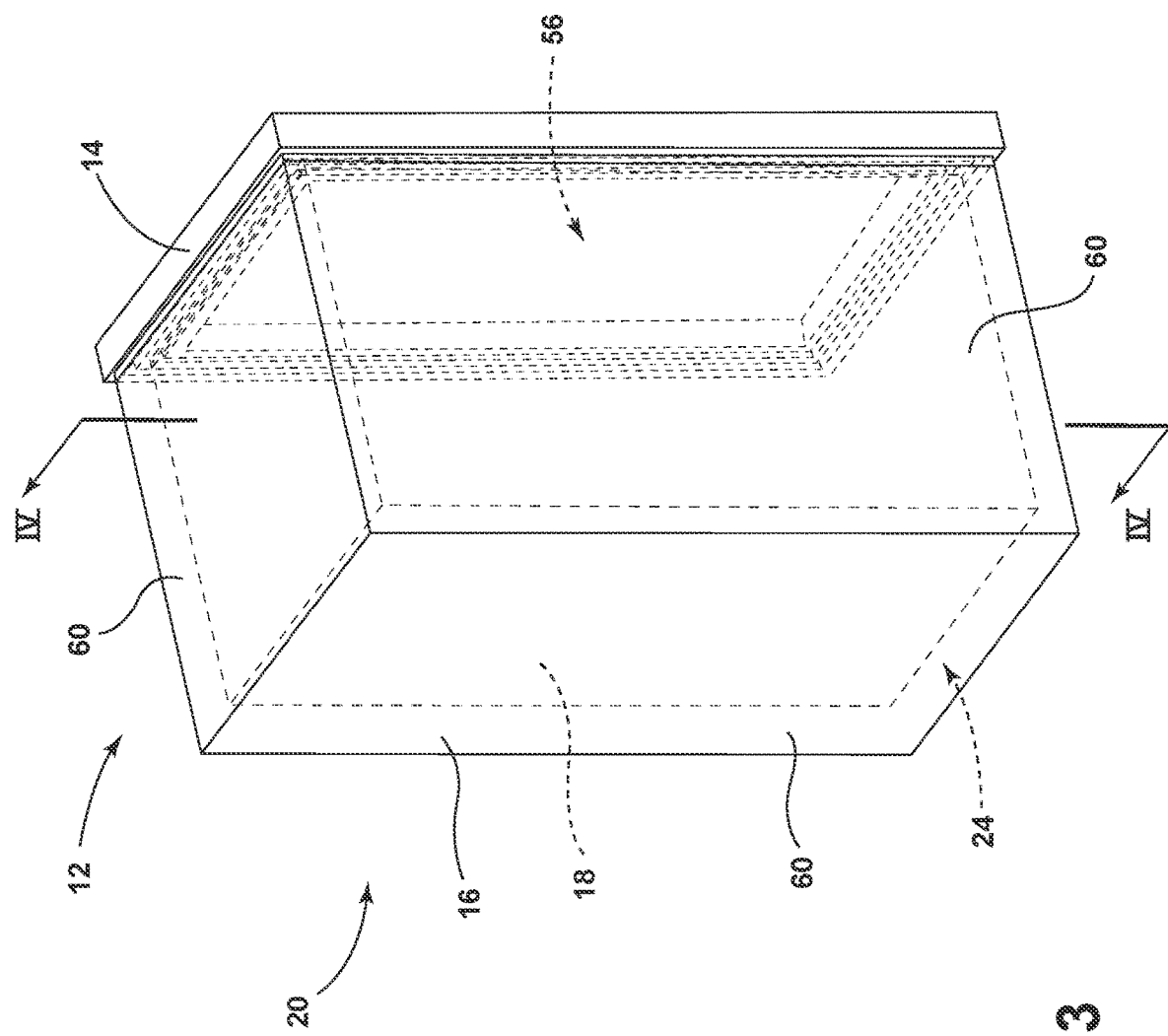
FIG. 3 is a top perspective view of the insulating structure of the present disclosure.

The components in the figures are not necessarily to scale, emphasis instead being placed upon illustrating the principles described herein.

DETAILED DESCRIPTION

The present illustrated embodiments reside primarily in apparatus components related to an insulating structure. Accordingly, the apparatus components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that an article or apparatus that comprises a list of elements does not include only those elements but may include other elements not expressly listed or inherent to such article or apparatus. An element proceeded by "comprises a . . . " does not, without more constraints, preclude the existence of additional identical elements in the article or apparatus that comprises the element.

Referring to FIGS. 1-12, reference numeral 10 generally designates an appliance having an insulating structure 12. The insulating structure 12 may include a trim breaker 14, a wrapper 16 coupled to the trim breaker 14, and a liner 18 coupled to the trim breaker 14. The liner 18 and the wrapper 16 may at least partially define a structural cabinet 20. The insulating structure 12 typically includes a barrier 22 positioned within an insulating cavity 24 between the liner 18 and the wrapper 16. The barrier 22 may also be coupled to the trim breaker 14. An inner compressible gasket 26 is proximate the liner 18 and may be coupled to the barrier 22. Additionally, an outer compressible gasket 28 is positioned proximate the wrapper 16 and also may be coupled to the barrier 22.

Referring again to FIGS. 1-12, it is contemplated that the insulating structure 12 may be in the form of a vacuum insulated structural cabinet or a vacuum insulated panel that may be used as an insulation member for the appliance 10. According to various examples, the insulating structure 12 includes the wrapper 16 and the liner 18, which may alternatively be referred to as a first panel and a second panel, respectively. The wrapper 16, the liner 18, and the barrier 22, coupled to the trim breaker 14, define the insulating cavity 24 in which one or more insulation materials 32 may be disposed. The insulation materials 32 may be a carbon-based powder and/or silicon oxide based materials; however, it is generally contemplated that other standard insulation materials 32 may be used as known in the art; such materials are described more fully below. The one or more insulation materials 32 substantially fill the insulating cavity 24 forming a substantially continuous layer between the liner 18 and the wrapper 16. An at least partial vacuum 34 is defined within the insulating cavity 24, where the at least partial vacuum 34 defines a pressure differential 36 between an exterior 38 of the insulating structure 12 and the insulating cavity 24. This pressure differential 36 serves to define an inward compressive force 40 that is exerted upon both the wrapper 16 and the liner 18 and tends to bias the wrapper 16 and the liner 18 toward the insulating cavity 24 of the insulating structure 12. The at least partial vacuum 34 within the insulating cavity 24 also tends to cause gas to infiltrate into the insulating cavity 24 from an area exterior to the appliance 10. This infiltration of gas is sometimes referred to as gas permeation.

Referring again to FIGS. 2-4, as depicted in the form of the structural cabinet 20, the wrapper 16 has a three-dimensional shape such that a plurality of panels 50 define a central cavity 52. Correspondingly and as depicted, the liner 18 has a plurality of surfaces 54 defining an inner cavity 56. It is generally contemplated that the liner 18 may be received within the central cavity 52 of the wrapper 16, thus partially defining the insulating cavity 24. Additionally, the wrapper 16 and the liner 18 include interior surfaces 58 and exterior surfaces 60 and may be made from a material capable of at least partially resisting bending, biasing, or otherwise being formed in response to the inward compressive force 40. These materials for the liner 18 and the wrapper 16 may include, but are not limited to, metals, plastics, polymers, metal alloys, combinations thereof, and other similar substantially rigid materials that can be used for vacuum insulated structures within appliances 10. It is contemplated that the liner 18 and the wrapper 16 may also be used to form the vacuum insulated panel. In such constructions, the wrapper 16 may be referred to as the first panel, and the liner 18 may be referred to as the second panel, as stated above.

Figure 6:
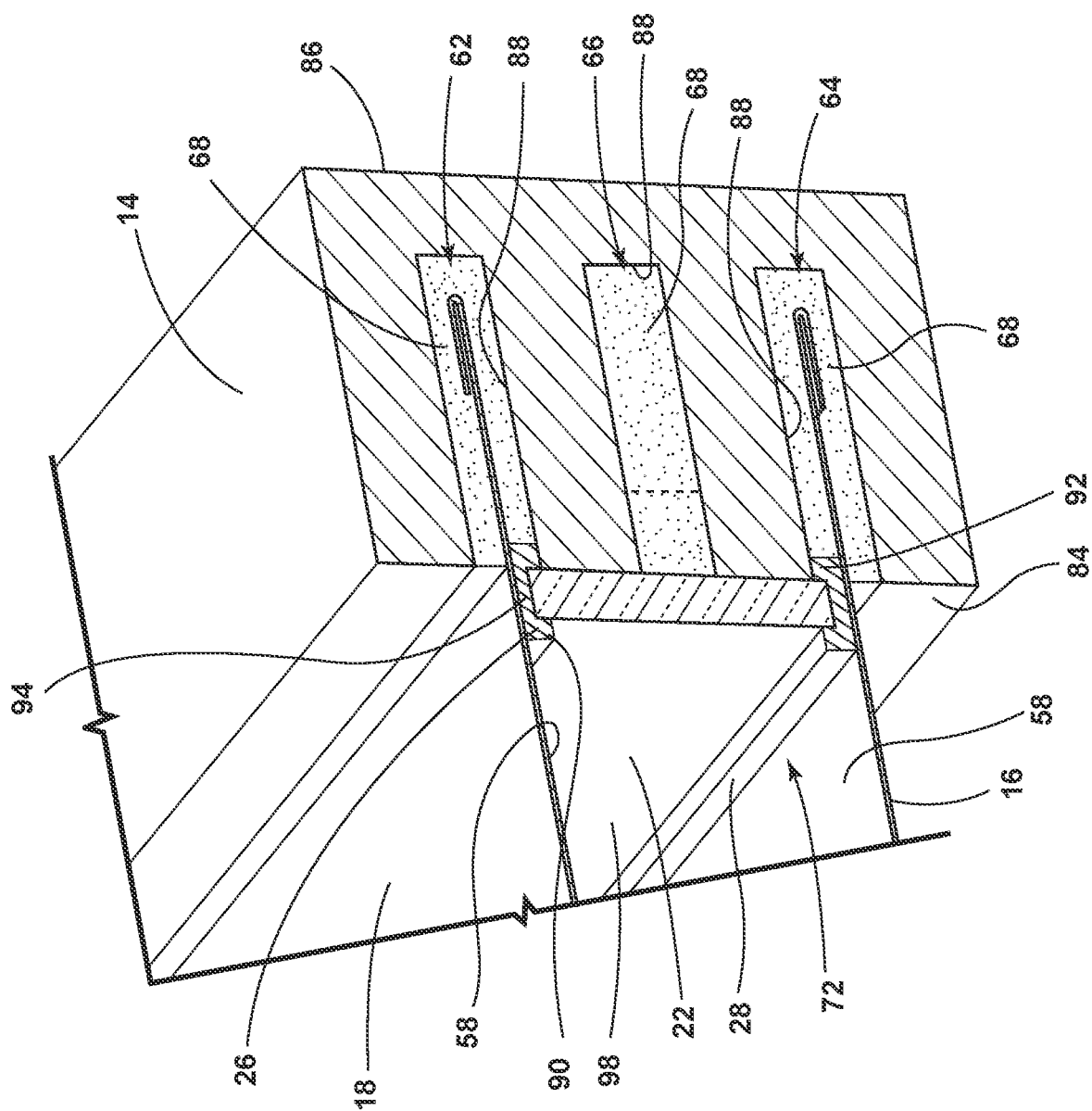
FIG. 6 is a cross-sectional view of the insulating structure of FIG. 4 taken at area VI of the present disclosure.

It is contemplated that an inner groove 62, an outer groove 64, and a central groove 66 are defined by the trim breaker 14. The inner and outer grooves 62, 64 may be configured to receive the liner 18 and the wrapper 16, respectively, to define the insulating structure 12. Additionally, the outer groove 64 may be alternatively referred to as the first groove, and the inner groove 62 may alternatively be referred to as the second groove. The inner and outer grooves 62, 64 may be filled with an adhesive 68 configured to couple the wrapper 16 and the liner 18 to the trim breaker 14. Additionally, the central groove 66, defined by the trim breaker 14, may be filled with the adhesive 68 configured to couple the barrier 22 with the trim breaker 14. As depicted in FIG. 6, the central groove 66 may be shallower, as indicated by the dashed line, than the inner and outer grooves 62, 64 such that a lesser amount of the adhesive 68 may be used to couple the barrier 22 to the trim breaker 14.

Alternatively, the adhesive 68 may be disposed directly on a receiving surface 84 of the trim breaker 14 between the liner 18 and the wrapper 16 such that the barrier 22 may be coupled directly with the trim breaker 14. Where the adhesive 68 is disposed directly on the trim breaker 14, it is generally contemplated that the central groove 66 may not be needed for coupling the barrier 22. Furthermore, the insulating structure 12 may be assembled by dispensing the adhesive 68 into the inner, outer, and central grooves 62, 64, 66 and placing the liner 18 into the inner groove 62. Additionally, the barrier 22, with the inner and outer gaskets 26, 28, is placed over at least the central groove 66 while the wrapper 16 is positioned in the outer groove 64. The assembly as described may then be cured and additional adhesive 68 may be applied to the locations where the wrapper 16 and the liner 18 abut the trim breaker 14.

Figure 4:
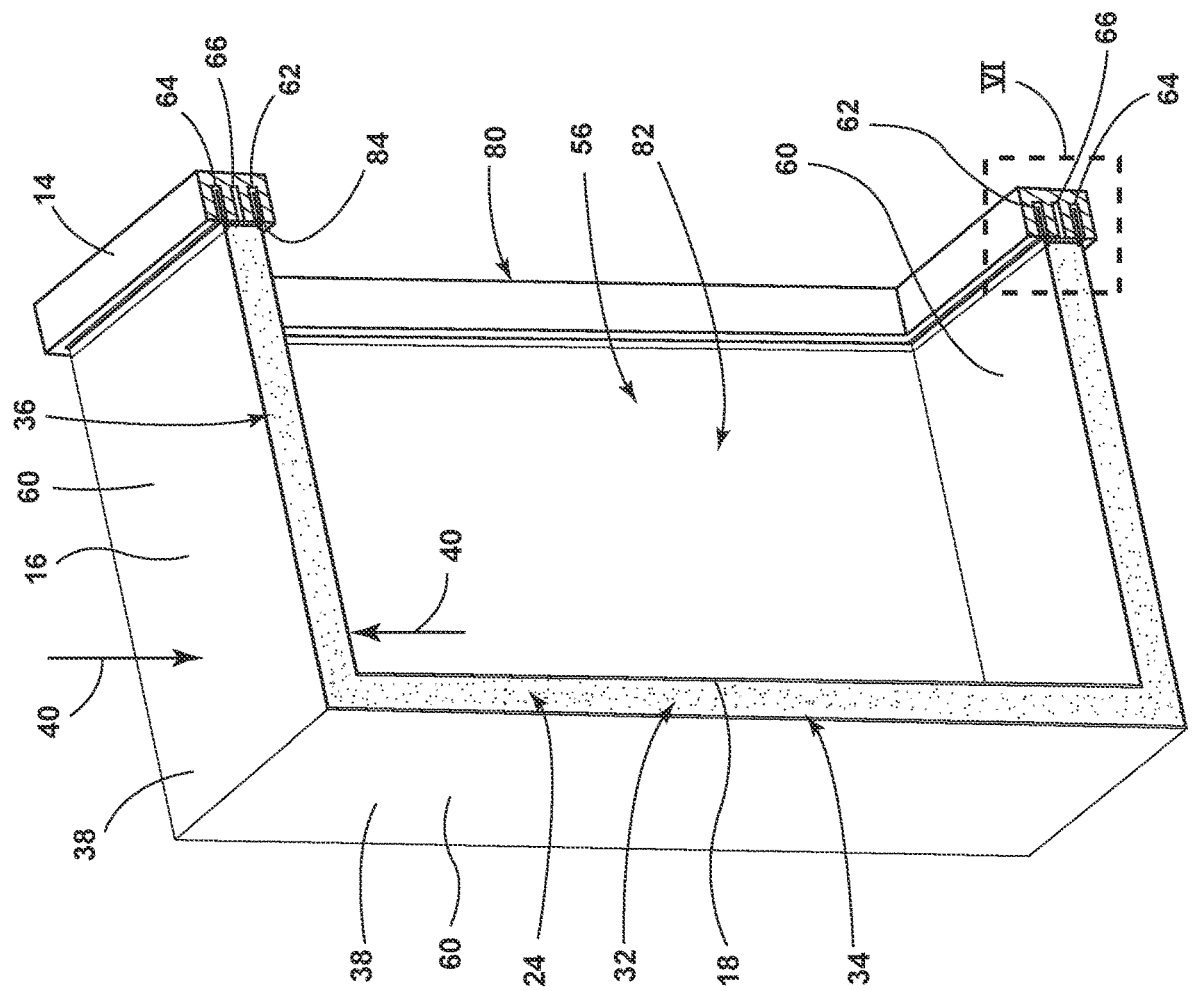
FIG. 4 is a cross-sectional view of the insulating structure of FIG. 3 taken along line IV-IV of the present disclosure.

A gasket assembly 72 includes at least one gasket 74, which may be coupled to the barrier 22, forming a barrier structure 76, to protect the barrier 22 from interactions with the liner 18 and the wrapper 16. Additionally or alternatively, the barrier 22 can include the gasket assembly 72. As illustrated in FIG. 4, the inner compressible gasket 26, or inner gasket, is adjacent the liner 18 and the outer compressible gasket 28, or outer gasket, is adjacent the wrapper 16. When expressing gas from the insulating cavity 24 the liner 18 and the wrapper 16 tend to bias towards one another such that the insulating cavity 24 may be decreased. As a result of such biasing, the liner 18 and the wrapper 16 may exert the inward compressive force 40 upon the barrier structure 76. The gasket assembly 72 may protect the barrier 22 from the inward compressive force 40 and from abrasive contact with the liner 18 and the wrapper 16. Specifically, when the inner and outer gaskets 26, 28 are utilized, the inner gasket 26 may protect the barrier 22 from rough contact with the liner 18, and the outer gasket 28 may protect the barrier 22 from rough contact with the wrapper 16.

Figure 5:
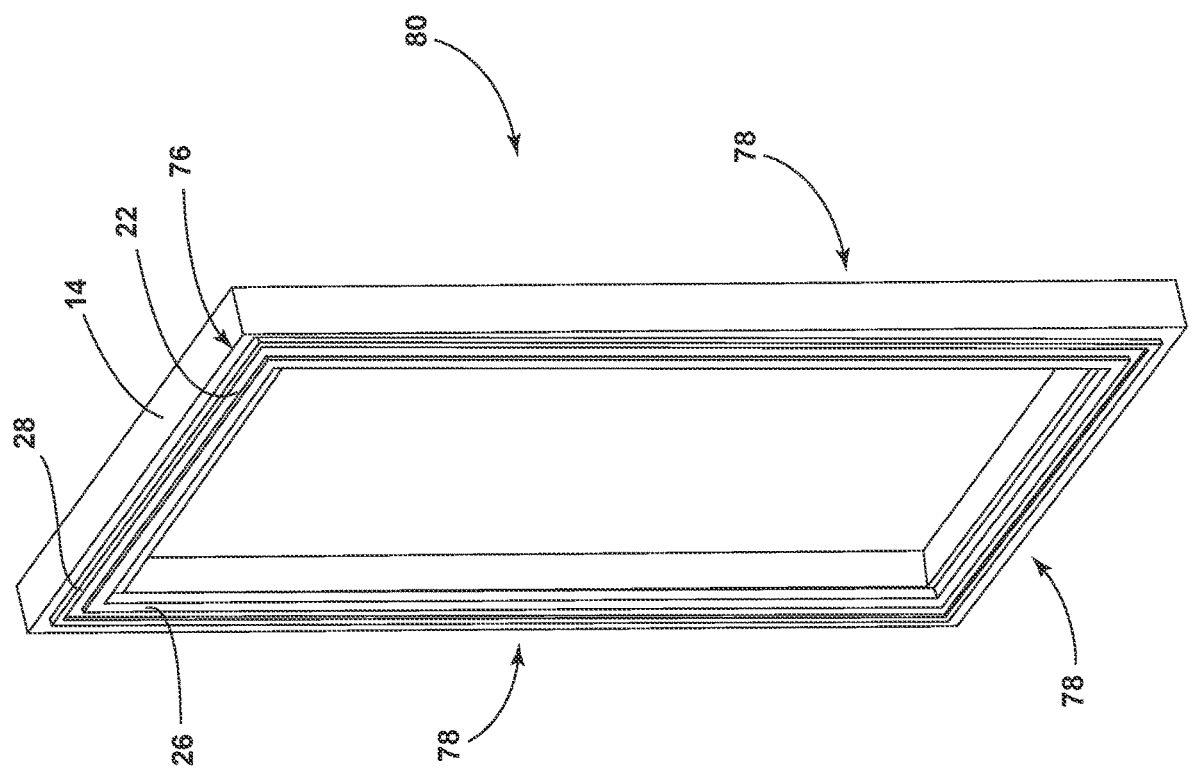
FIG. 5 is a top perspective view of a trim breaker and a barrier structure of the present disclosure.

Referring now to FIGS. 4-6, the trim breaker 14 may be formed from a plastic material, but it will be understood by one having ordinary skill in the art that other materials may be used to form the trim breaker 14. As depicted, the trim breaker 14 has a generally rectangular shape; however, it is contemplated that other geometric shapes known in the art may be used. A plurality of edges 78 form a border 80 of the insulating structure 12 and define an opening 82. Said another way, the border 80 of the insulating structure 12 is defined by the plurality of edges 78 of the trim breaker 14. The plurality of edges 78 may further define the inner cavity 56 defined by the liner 18 by providing the border 80 outlining the inner cavity 56. Additionally, the plurality of edges 78 of the trim breaker 14 may have a receiving surface 84 and a solid surface 86, where the receiving surface 84 may include the inner, central, and outer grooves 62, 66, 64, such that the liner 18, the barrier 22, and the wrapper 16 may be received, respectively.

Moreover, the inner, outer, and central grooves 62, 64, 66 include interior portions 88 that contact with and receive the adhesive 68 to secure the liner 18, the barrier 22, and the wrapper 16. As indicated by the dashed line (shown in FIG. 6), the central groove 66 may have a shallower depth than the inner and outer grooves 62, 64 such that a lesser amount of the adhesive 68 may be used to fill the central groove 66. In certain embodiments, the adhesive 68 may overflow from the central groove 66. In such an embodiment, the barrier 22 may be adhered at the central groove 66 and at the receiving surface 84. Alternatively, the trim breaker 14 may not include the central groove 66 such that the barrier 22 may be coupled directly to the receiving surface 84 of the trim breaker 14. In a further alternative construction, the barrier structure 76 may be disposed upon the trim breaker 14 in such a way that there is no overlap of the barrier structure 76 with the inner and outer grooves 62, 64, whereas, as depicted, the barrier structure 76 slightly overhangs the inner and outer grooves 62, 64.

Referring still to FIGS. 5 and 6, the barrier structure 76 is typically centrally disposed along the trim breaker 14. Being centrally disposed the liner 18 and the wrapper 16 may surround the barrier structure 76 such that the barrier structure 76 is disposed between the liner 18 and the wrapper 16. As described above, the barrier structure 76 includes the gasket assembly 72 that includes the inner and outer gaskets 26, 28 to buffer the liner 18 and the wrapper 16 from directly contacting the barrier 22. By way of example, and not limitation, the inner gasket 26 contacts the interior portion 88 of the inner groove 62 and the interior surface 58 of the liner 18; the outer gasket 28 contacts the interior portion 88 of the outer groove 64 and the interior surface 58 of the wrapper 16.

Figure 7:
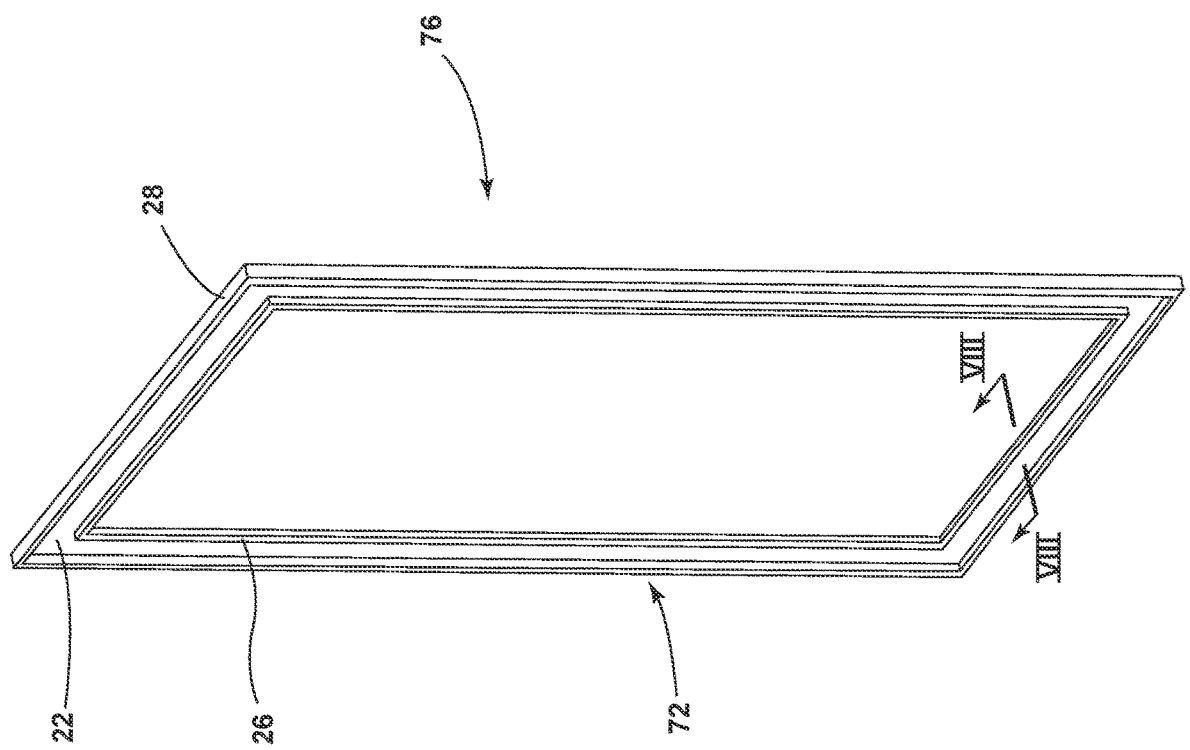
FIG. 7 is a top perspective view of the barrier structure of the present disclosure.
Figure 8:
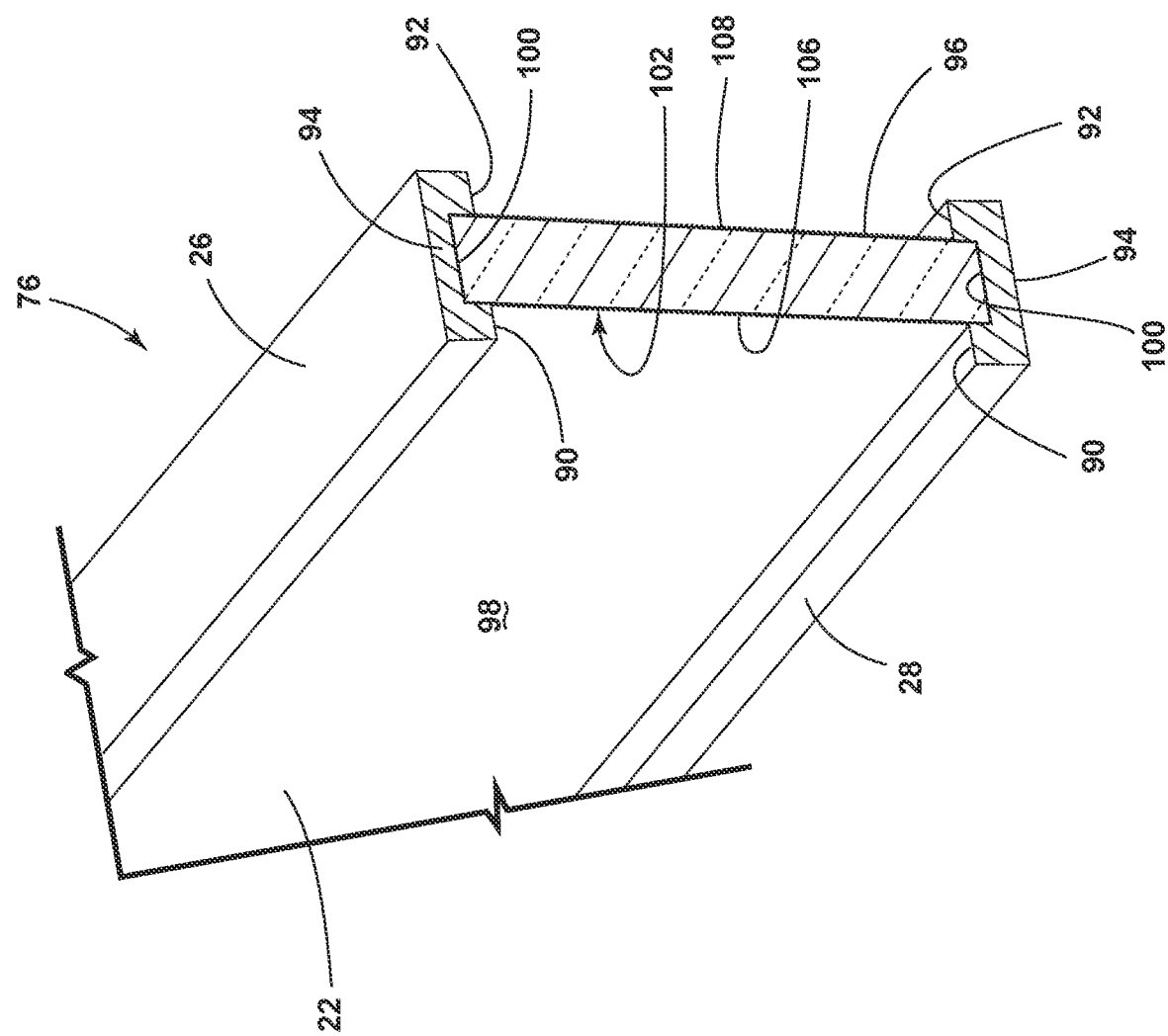
FIG. 8 is a schematic cross-sectional view of an exemplary barrier structure taken along the line VIII-VIII of the present disclosure.
Figure 9:
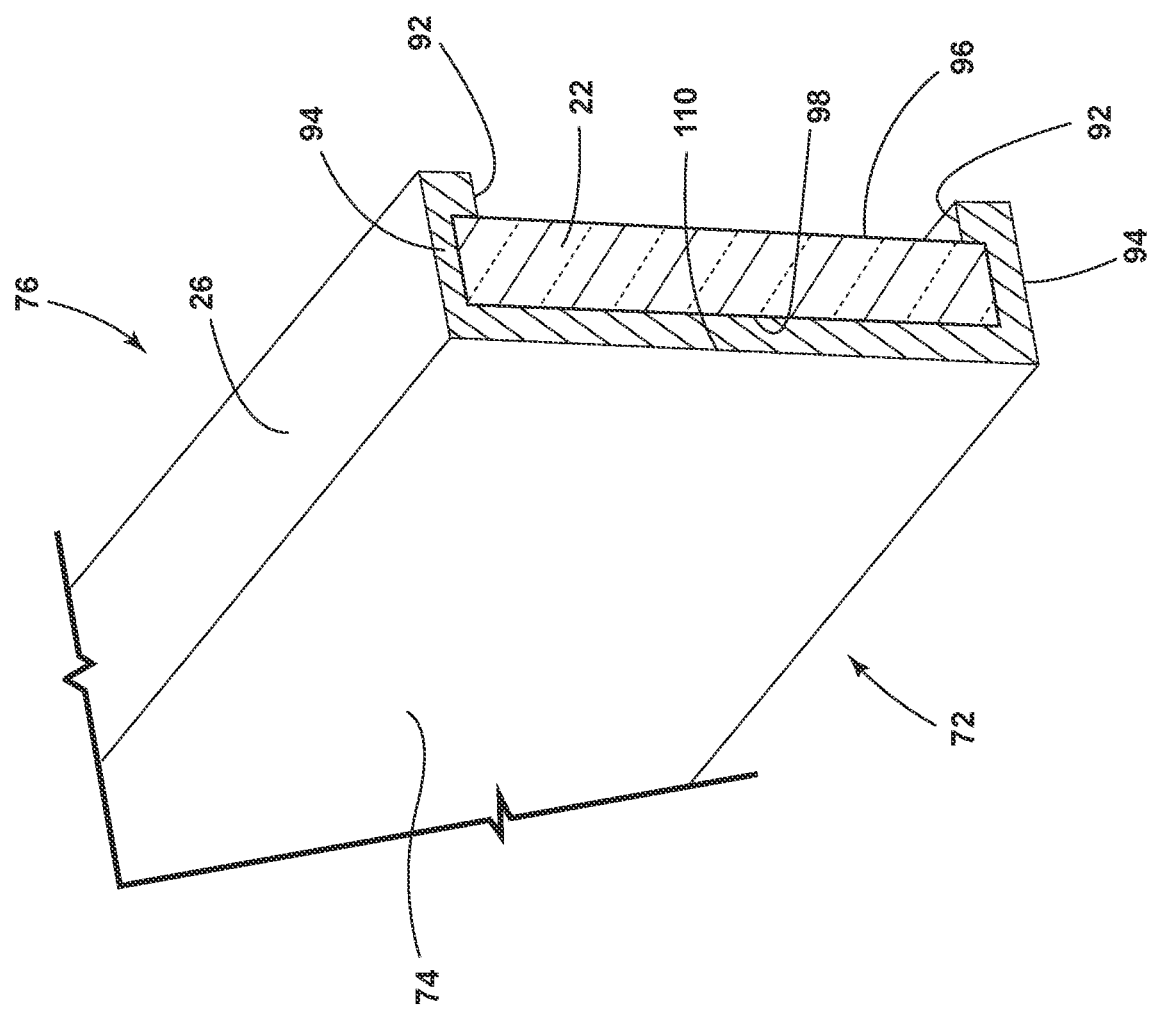
FIG. 9 is a schematic cross-sectional view of an exemplary barrier structure of the present disclosure.

As illustrated in FIGS. 6-8, the inner and outer gaskets 26, 28 may each include a first lip 90 and a second lip 92 connected by a bracing portion 94 such that the bracing portions 94 of the inner and outer gaskets 26, 28 may contact with the interior surfaces 58 of the liner 18 and the wrapper 16. The second lips 92 of the inner and outer gaskets 26, 28 may contact the interior portions 88 of the inner and outer grooves 62, 64, where the second lips 92 may further contact and couple with the adhesive 68 in the inner and outer grooves 62, 64. In such aspect, the barrier 22 partially extends over the inner and outer grooves 62, 64 such that the second lips 92 wrap around an adhering surface 96 of the barrier 22 to contact the interior portions 88 of the inner and outer grooves 62, 64. Additionally in such aspect, the first lips 90 wrap around an insulation surface 98 of the barrier 22 and the second lips 92 wrap around the adhering surface 96 of the barrier 22, such that the first lips 90, bracing portions 94, and the second lips 92 form a C-shape around edge portions 100 of the barrier 22.

Referring again to FIGS. 7 and 8, the barrier structure 76 may be a generally rectangular shape to follow the border 80 of the insulating structure 12. As such, the barrier 22 may be one continuous piece of material. It is generally contemplated that the barrier 22 may be constructed from glass, ceramic, or a glass-ceramic compound. Where one of these materials is used to form the barrier, it is contemplated that the gas permeation rates between the trim breaker 14 and the insulating cavity 24 are favorably diminished. For example, a glass barrier may have a lower gas permeation rate when compared with a plastic barrier. As such, the use of a glass barrier may maintain the at least partial vacuum 34 longer than a plastic barrier. The use of the glass barrier, in combination with the metallic liner 18 and wrapper 16 can further diminish the rate of gas permeation into the insulating structure 12. Thus, the integrity of the insulating structure 12, whether the vacuum insulated structural cabinet or panel, may be maintained, ultimately increasing the useful life of the insulating structure 12.

In further reference to FIGS. 7 and 8, the barrier 22 may be surrounded or partially surrounded by a film 102, which may be a single film 104 or include a first film 106 and a second film 108. The film 102 may be a resin or laminate; however, it will be understood by one having ordinary skill in the art that other film materials may be used. The first film 106 may be adhered to the insulation surface 98 of the barrier 22, and the second film 108 may be adhered to the adhering surface 96 of the barrier 22. Once installed, the insulating structure 12 may be subject to shifting, rough movement, and general wear-and-tear that accompanies the transport and use of the appliance 10. As such, there is potential for damage to the barrier 22 throughout the useful life of the barrier 22. The film 102 may provide added protection by enveloping the barrier 22.

By way of example, not limitation, where the barrier 22 is made of glass it may fracture over time, such as during manufacture, delivery, or use of the appliance 10. If fracturing should occur, the film 102 helps to prevent glass from spreading throughout the insulating structure 12. Additionally, if fracturing were to occur, the film 102 may help maintain the at least partial vacuum 34 within the insulating structure 12 until the insulating structure 12 can be repaired. Thus, in combination with the gasket assembly 72 and the barrier structure 76, the film 102 may extend the useful life of the insulating structure 12.

Additionally as illustrated, the barrier 22 is surrounded by the inner and outer gaskets 26, 28, which provide further protection from the liner 18 and wrapper 16. Where glass is used to form the barrier 22, the inner and outer gaskets 26, 28 may prevent excess force that may otherwise damage the barrier 22. Said another way, the inner and outer gaskets 26, 28 are elastic and compressible such that when the inward compressive force 40 is exerted upon the insulating cavity 24, the inner and outer gaskets 26, 28 are configured to absorb the inward compressive force 40. Accordingly, the inner and outer gaskets 26, 28 may minimize the effect of the inward compressive force 40 upon the barrier 22. It is generally contemplated that the inner and outer gaskets 26, 28 may be made from continuous pieces of elastomeric material (e.g., rubber) such that the inner gasket 26 may be one single piece and the outer gasket 28 may be one single piece; however, one having skill in the art would understand that other compressible materials may be used to form the inner and outer gaskets 26, 28.

Referring further to FIGS. 9-12, the at least one gasket 74 may extend across the insulation surface 98 of the barrier such that the first lips 90 extend into a cover portion 110 that extends between the first lips 90 and the inner and outer gaskets 26, 28. Additionally, the at least one gasket 74 may extend partially along the edge portions 100 of the barrier 22. Alternatively, the at least one gasket 74 may have the second lips 92 such that the cover portion 110, the bracing portion 94, and the second lips 92 may form a generally C-shape. It is also contemplated that the cover portion 110 may be intermittently disposed along the barrier structure 76. Alternatively, the cover portion 110 may extend along the barrier 22 such that the insulation surface 98 of the barrier 22 is covered by the cover portion 110. The at least one gasket 74 may provide buffer protection for the barrier 22 with respect to the wrapper 16 and the liner 18.

Figure 10:
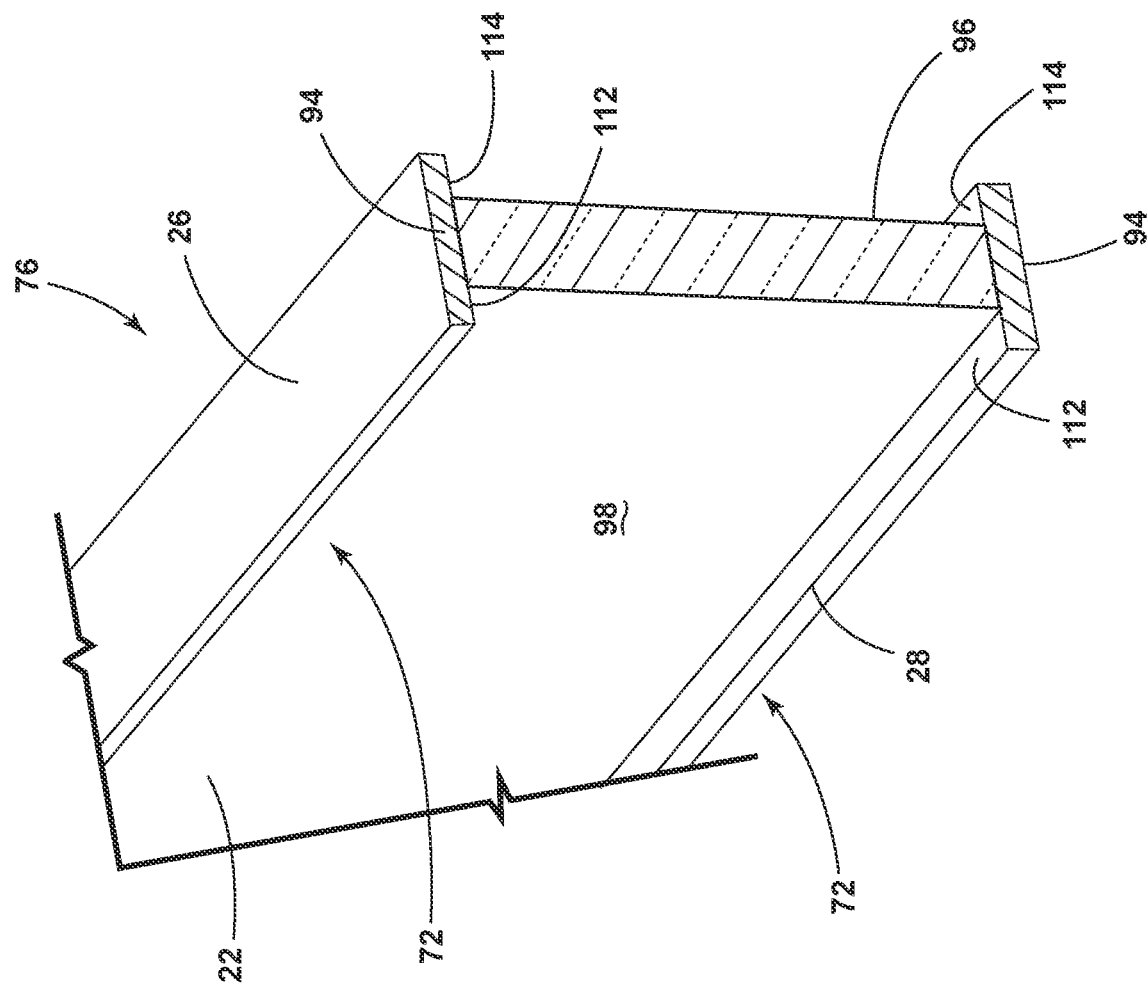
FIG. 10 is a schematic cross-sectional view of an exemplary barrier structure of the present disclosure.

Alternatively referring to FIG. 10, the gasket assembly 72 includes the inner and outer gaskets 26, 28 along the edge portions 100 of the barrier 22. As illustrated in FIG. 10, the inner and outer gaskets 26, 28 have a straight or generally planar construction. In such example, the gasket assembly 72 includes only the bracing portions 94 that can include a first extension 112 and a second extension 114. The first extension 112 may contact with the insulation materials 32, and the second extension 114 may contact with the receiving surface 84 of the trim breaker 14. It is generally contemplated that the bracing portion 94 contacts with the interior surfaces 58 of the wrapper 16 and the liner 18. The barrier structure 76 depicted in FIG. 10 may overhang the inner and outer grooves 62, 64 such that the barrier 22 contacts the adhesive 68 in the inner and outer grooves 62, 64. Alternatively, it is completed that the barrier 22 is centrally aligned on the trim breaker 14 such that overhang of the barrier 22 relative the inner and outer grooves 62, 64 does not substantially occur. In such a configuration, the second extension 114 of the barrier structure 76 contacts with both the interior surfaces 58 of the liner 18 and the wrapper 16, respectively, as well as the interior portions 88 of the inner and outer grooves 62, 64, respectively.

Figure 11:
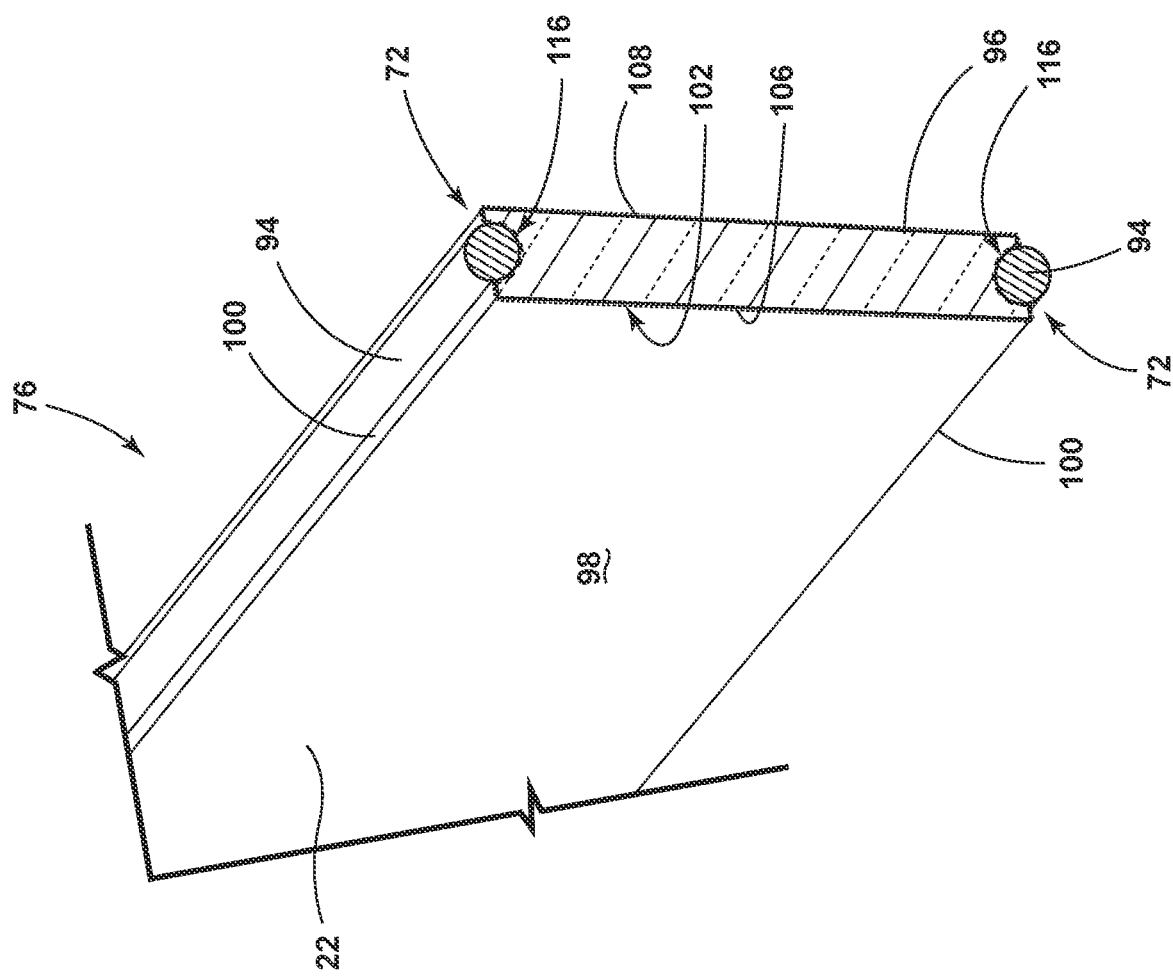
FIG. 11 is a schematic cross-sectional view of an exemplary barrier structure of the present disclosure.
Figure 12:
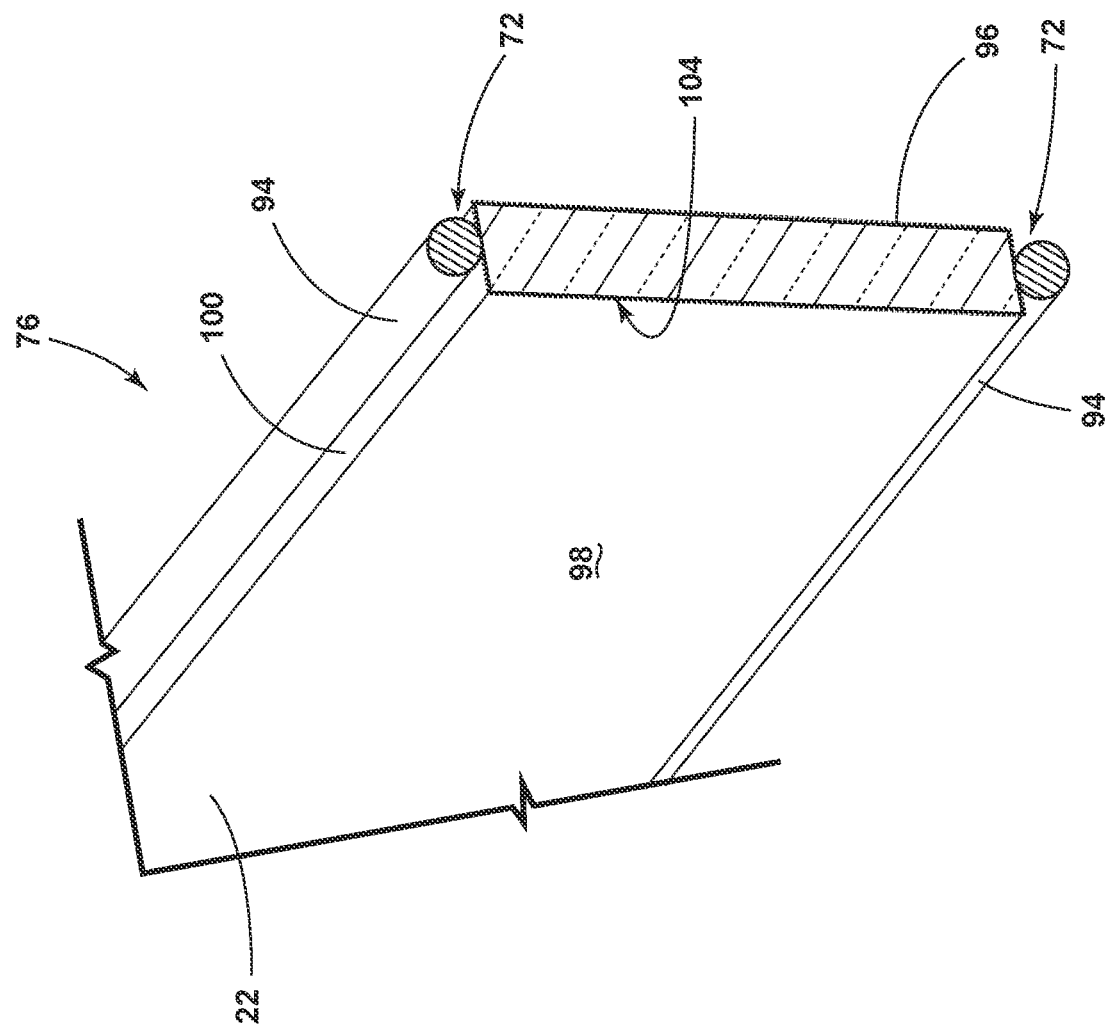
FIG. 12 is a schematic cross-sectional view of an exemplary barrier structure of the present disclosure.

Referring to FIGS. 11 and 12, the gasket assembly 72 includes the inner and outer gaskets 26, 28 having an extruded configuration. It is contemplated that when the inner and outer gaskets 26, 28 are in the extruded configuration, either hollow or solid, the bracing portions 94 encompass the entirety of the inner and outer gaskets 26, 28. For example, the bracing portions 94 contact the adhesive 68 in the inner and outer grooves 62, 64, interior surfaces 58 of the liner 18 and the wrapper 16, and the insulation materials 32. As illustrated in FIG. 11, the barrier 22 includes recesses 116 configured to receive and locate the inner and outer gaskets 26, 28, respectively, within the edge portions 100 of the barrier 22. Alternatively, as illustrated in FIG. 12, the inner and outer gaskets 26, 28 can be disposed adjacent the edge portions 100 of the barrier 22 such that the barrier 22 does not include the recesses 116.

According to the various examples, the insulating structure 12 can be used in various appliances 10 that can include, but are not limited to, refrigerators, freezers, coolers, ovens, dishwashers, laundry appliances, water heaters, and other similar appliances and fixtures within household and commercial settings. Additionally, the insulation materials 32 can be a free-flowing material that can be poured, blown, compacted or otherwise disposed within the insulating cavity 24. This free-flowing material can be in the form of various silica-based materials, such as fumed silica, precipitated silica, nano-sized and/or micro-sided aerogel powder, rice husk ash powder, perlite, glass spheres, hollow glass spheres, cenospheres, diatomaceous earth, combinations thereof, and other similar insulating particulate material.

According to another aspect of the present disclosure, an insulating structure for an appliance includes a trim breaker, a wrapper coupled to the trim breaker, a liner coupled to the trim breaker, wherein the liner and the wrapper at least partially define a structural cabinet, a barrier positioned between the liner and the wrapper, the barrier coupled to the trim breaker, an inner gasket proximate the liner and coupled to the barrier, and an outer gasket proximate the wrapper and coupled to the barrier.

According to still another aspect of the present disclosure, the barrier is a material selected from the group consisting of glass, ceramic, and glass-ceramic.

According to yet another aspect of the present disclosure, the trim breaker further defines an inner groove, a central groove, and an outer groove.

According to another aspect of the present disclosure, the barrier is coupled to the trim breaker by adhesive disposed within the central groove.

According to still another aspect of the present disclosure, insulation materials are disposed within a cavity defined by the liner and the wrapper.

According to yet another aspect of the present disclosure, the wrapper is positioned within the outer groove and the liner is positioned within the inner groove.

According to another aspect of the present disclosure, the barrier includes a first film and a second film.

According to another aspect of the present disclosure, an insulating structure includes a trim breaker, a first panel coupled to the trim breaker, a second panel coupled to the trim breaker and proximate the first panel, and a barrier positioned between the first and the second panels.

According to still another aspect of the present disclosure, the barrier is a material selected from the group consisting of glass, ceramic, and glass-ceramic compound.

According to another aspect of the present disclosure, a first film and a second film, the first and second films coupled to the barrier.

According to yet another aspect of the present disclosure, the trim breaker defines a first groove, a second groove, and a central groove.

According to another aspect of the present disclosure, an adhesive is disposed within the central groove and couples the barrier with the trim breaker.

According to another aspect of the present disclosure, the first panel is positioned within the first groove and the second panel is positioned within the second groove.

According to still another aspect of the present disclosure, at least one gasket includes an inner gasket and an outer gasket, wherein the outer gasket is proximate the first panel and the inner gasket is proximate the second panel.

According to another aspect of the present disclosure, wherein the at least one gasket is a compressible material.

According to yet another aspect of the present disclosure, an appliance includes a trim breaker, a first panel coupled to the trim breaker, a second panel coupled to the trim breaker and proximate the first panel, a barrier of a glass-type material positioned between the first and the second panels, and the barrier coupled to the trim breaker.

According to another aspect of the present disclosure, the first and second panels define a cavity.

According to another aspect of the present disclosure, insulation materials disposed within the cavity defined by the first and second panels.

According to still another aspect of the present disclosure, the barrier includes a gasket assembly.

According to another aspect of the present disclosure, the barrier includes a film that is adhered to the barrier.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. An insulating structure comprising:
   a trim breaker having a first groove, a second groove, and a central groove that is positioned between the first groove and the second groove;
   a first panel coupled to the trim breaker within the first groove;
   a second panel coupled to the trim breaker within the second groove and proximate the first panel;
   a barrier having a first surface and a second surface, the barrier being positioned between the first panel and the second panel and coupled to the trim breaker via the second surface wherein an adhesive is disposed within the central groove and couples the barrier with the trim breaker;
   a first film coupled to the first surface of the barrier;
   a second film coupled to the second surface of the barrier; and
   at least one gasket includes an inner gasket and an outer gasket, wherein the outer gasket engages the first panel and the inner gasket engage the second panel.

2. The insulating structure of claim 1, wherein the at least one gasket includes a cover portion that extends between the inner gasket and the outer gasket.

3. The insulating structure of claim 2, wherein the at least one gasket is a single gasket that includes the inner gasket, the outer gasket and the cover portion as a single unitary member.

4. The insulating structure of claim 1, wherein the inner gasket and the outer gasket are extruded members that extend along edge portions of the barrier.

5. The insulating structure of claim 4, wherein the edge portions of the barrier include recesses that receive the inner gasket and the outer gasket, respectively.

6. The insulating structure of claim 1, wherein the barrier is a material selected from a group consisting of glass, ceramic, and glass-ceramic compound.

7. The insulating structure of claim 1, wherein the first and second films extend around edge portions to define an envelope, wherein the envelope is positioned between the barrier and the at least one gasket.

8. The insulating structure of claim 1, wherein the at least one gasket is a compressible material.

9. The insulating structure of claim 2, wherein the inner gasket and the outer gasket engage the second surface and the cover portion engages the first surface.

10. The insulating structure of claim 1, wherein each of the first groove, the second groove, and the central groove are defined by a receiving surface of the trim breaker, wherein the barrier engages the receiving surface.

11. The insulating structure of claim 10, wherein the barrier is a planar member that engages the receiving surface and engages the adhesive disposed within the central groove.

12. A vacuum insulated structure, comprising:
    a trim breaker having a first groove, a second groove, and a central groove that is disposed between the first groove and the second groove;
    a first panel coupled to the trim breaker within the first groove;
    a second panel coupled to the trim breaker within the second groove and proximate the first panel; and
    a barrier of a glass-type material positioned between the first panel and second panel, the barrier having at least one surface coupled to the trim breaker via an adhesive disposed within the central groove, the barrier including a gasket assembly operably coupled to the first panel and the second panel, wherein the gasket assembly includes an inner gasket and an outer gasket that engage edge portions of the barrier.

13. The vacuum insulated structure of claim 12, wherein the edge portions of the barrier define recesses that receive the inner gasket and the outer gasket, respectively.

14. The vacuum insulated structure of claim 12, wherein the inner gasket and the outer gasket each include an extruded configuration.

15. The vacuum insulated structure of claim 12, wherein the barrier includes a film that is adhered to the barrier.

16. The vacuum insulated structure of claim 15, wherein the film defines an envelope that surrounds the barrier, wherein the film is disposed between the barrier and the gasket assembly.

17. The vacuum insulated structure of claim 12, wherein each of the first groove, the second groove, and the central groove are defined by a receiving surface of the trim breaker, wherein the barrier engages the receiving surface.

18. An insulating structure comprising:
    a trim breaker having a first groove, a second groove, and a central groove, wherein the trim breaker is coupled to a first panel via the first groove and a second panel via the second groove to define an insulating cavity therein;
    a barrier attached to the trim breaker via an adhesive disposed within the central groove and having an insulation surface and an adhering surface with edge portions between the insulation surface and the adhering surface, the barrier being positioned between the first panel and the second panel and coupled to the trim breaker via the adhering surface;
    an inner gasket proximate the second panel and coupled to the barrier; and an outer gasket proximate the first panel and coupled to the barrier, the inner gasket and the outer gasket each having an extruded configuration and being positioned within recesses defined within the edge portions of the barrier.

19. The insulating structure of claim 18, wherein the barrier is a material selected from a group consisting of glass, ceramic, and glass-ceramic.

20. The insulating structure of claim 18, wherein each of the first groove, the second groove, and the central groove are defined by a receiving surface of the trim breaker, wherein the barrier engages the receiving surface.

\* \* \* \* \*